(12) United States Patent
Ramamurthy et al.

(10) Patent No.: US 10,839,404 B2
(45) Date of Patent: Nov. 17, 2020

(54) INTELLIGENT, INTERACTIVE, AND SELF-LEARNING ROBOTIC PROCESS AUTOMATION SYSTEM

(71) Applicant: EPIANCE SOFTWARE PVT. LTD., Karnataka (IN)

(72) Inventors: Ravi Ramamurthy, Karnataka (IN); Ramgopal M Cillanki, Karnataka (IN)

(73) Assignee: EPIANCE SOFTWARE PVT. LTD., Bangalore (IN)

( * ) Notice: Subject to any disclaimer, the term of this patent is extended or adjusted under 35 U.S.C. 154(b) by 196 days.

(21) Appl. No.: 15/614,646

(22) Filed: Jun. 6, 2017

(65) Prior Publication Data

US 2017/0352041 A1    Dec. 7, 2017

Related U.S. Application Data

(60) Provisional application No. 62/365,408, filed on Jul. 22, 2016.

(51) Int. Cl.
| | |
|---|---|
| *G06Q 30/02* | (2012.01) |
| *G06N 5/04* | (2006.01) |
| *G06N 20/00* | (2019.01) |
| *G06F 16/907* | (2019.01) |
| *G06F 40/226* | (2020.01) |
| *G06F 3/0484* | (2013.01) |
| *H04L 12/58* | (2006.01) |

(52) U.S. Cl.
CPC ......... *G06Q 30/02* (2013.01); *G06F 3/04847* (2013.01); *G06F 16/907* (2019.01); *G06F 40/226* (2020.01); *G06N 5/043* (2013.01); *G06N 20/00* (2019.01); *H04L 51/02* (2013.01); *G06N 5/047* (2013.01)

(58) Field of Classification Search
CPC ....................................................... G06Q 30/02
See application file for complete search history.

(56) References Cited

U.S. PATENT DOCUMENTS

| | | | | |
|---|---|---|---|---|
| 6,829,613 | B1 * | 12/2004 | Liddy | ...................... A63H 3/28 707/694 |
| 7,925,605 | B1 * | 4/2011 | Rubin | .................... G06N 5/025 706/47 |

(Continued)

*Primary Examiner* — Andrew C Georgandellis
(74) *Attorney, Agent, or Firm* — Prakash Nama; Global IP Services, PLLC

(57) ABSTRACT

In one example, an intent along with a parsed relevant data, associated with a received customer request, is determined. The determined intent and the parsed relevant data is validated and rectified by a validation agent. The extracted relevant data is then verified based on an outcome of the validation and rectification agent by one or more verifying software robots. Applicable rules are then extracted from associated knowledge databases based on the determined intent and the relevant data upon successful validation, rectification, and verification. The rules, associated with the customer request, are then determined from the extracted applicable rules, the determined intent and/or the relevant data. The determined rules are then reviewed by a reviewing agent. A decision is then prepared and sent to the customer based on an outcome of the reviewed determined rules by one or more decision making software robots.

19 Claims, 9 Drawing Sheets

(56) References Cited

U.S. PATENT DOCUMENTS

| | | | | |
|---|---|---|---|---|
| 2002/0144537 | A1* | 10/2002 | Sharp | G01N 1/26 |
| | | | | 73/31.01 |
| 2007/0100625 | A1* | 5/2007 | Silvera | G10L 15/22 |
| | | | | 704/257 |
| 2013/0066854 | A1* | 3/2013 | Ojha | H04W 80/12 |
| | | | | 707/722 |
| 2015/0047003 | A1* | 2/2015 | Khan | H04L 63/08 |
| | | | | 726/7 |
| 2015/0363557 | A1* | 12/2015 | Van Arkel | G06F 19/328 |
| | | | | 705/2 |
| 2017/0323371 | A1* | 11/2017 | Lampert | G06Q 10/0833 |

* cited by examiner

FIG. 4A

INTELLIGENT, INTERACTIVE, AND SELF-LEARNING ROBOTIC PROCESS AUTOMATION SYSTEM

RELATED APPLICATIONS

Benefit is claimed under 35 U.S.C. 119(a)-(d) to Indian Application Serial No. 201641019441 filed on Jun. 6, 2016, entitled "INTELLIGENT INTERACTIVE SELF LEARNING BUSINESS PROCESS PERFORMANCE ENHANCER" and U.S Provisional Application Ser. No. 62/365,408 filed on Jul. 22, 2016, entitled "INTELLIGENT INTERACTIVE SELF LEARNING BUSINESS PROCESS PERFORMANCE ENHANCER", by EPIANCE SOFTWARE PVT. LTD., which is herein incorporated in its entirety by reference for all purposes.

BACKGROUND

Robotic Process Automation (RPA) is becoming an increasing area of interest for automating business processes. Generally, RPA is being used at the Graphic User Interface (GUI) layer without any modifications to the underlying computer software applications. Typically, RPAs mimic end users by playing back keyboard and mouse events. However, such use of RPAs to automate business processes may be applicable in processes having structured data environment and may not require or require very little decision making. Many of the customer initiated business processes include communication interactions, such as voice (i.e., phone), text (e.g., email/chat) and so on. Such business processes initiated by the customer using unstructured data may require knowledge, skill, and/or intelligence to understand and interpret the unstructured data by an agent to use relevant rules to carry on with the next stage of the process and/or transaction. In such a scenario, the accuracy and efficiency of the initiated processes/transactions may depend on the skills, productivity, experience, knowledge, attentiveness and the like of the agents handling the initiated interaction including the unstructured data.

BRIEF DESCRIPTION OF THE DRAWINGS

Examples are described in the following detailed description and in reference to the drawings, in which:

FIG. 4A depicts a screenshot of an example user interface including step-by-step guidance and the target application to be used for the process provided by a performance support module residing in the performance engine;

DETAILED DESCRIPTION

The intelligent, interactive, and self-learning robotic process automation (RPA) system may be automated to understand and act on unstructured data received via user interaction in a business process. The intelligent, interactive, and self-learning RPA system may overcome issues of accuracy and efficiency associated with unstructured data and processes by using available tools based on application context and awareness of the process. The tools may be in the form of a process documentation, live-in-app step-by-step process guidance, live-in-the app business rule compliance and so on.

Examples described herein may include various subsystems that may or may not be necessary and may be assembled as needed for any given business process.

The term "software robot" refers to any type of software (e.g., may or may not incorporate artificial intelligence (AI)) that automates manual processes. Software robots are recorded scripts that can mimic end-users by playing back/simulating mouse and keyboard events on a target application. Software robots may also provide additional widgets for reading various file formats like doc, pdf, xls, database and web services and the like. Further, software robots may also be extended by writing custom scripts.

Figure 1:
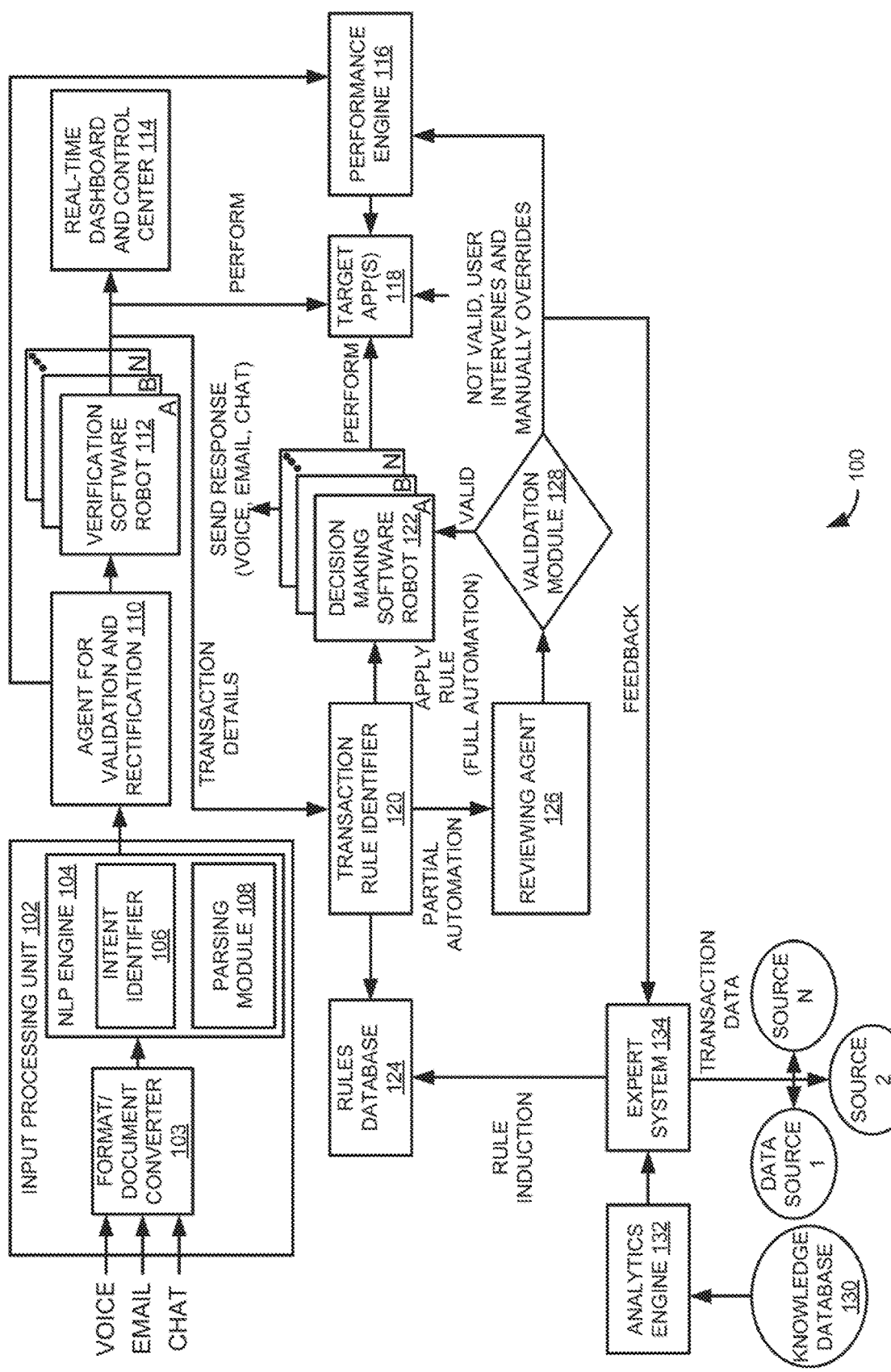
FIG. 1 is a block diagram illustrating an example intelligent, interactive, and self-learning RPA system.

Turning now to figures, FIG. 1 is a block diagram 100 illustrating an example intelligent, interactive, and self-learning RPA system. As shown in FIG. 1, the system includes an input processing unit 102, a validation and rectification agent 110, one or more verification software robots 112, a real-time dashboard and control center 114, a performance engine 116, target app(s) 118, transaction rule identifier 120, one or more decision making software robots 122, a rules database 124, a reviewing agent 126, a validation module 128, a knowledge database 130, an analytics engine 132, an expert system 134, and data sources 1-N. Further as shown in FIG. 1, the input processing unit 102 includes a format/document converter 103 and a natural language processing (NLP) engine 104. Furthermore as shown in FIG. 1, the NLP engine 104 includes an intent identifier 106 and a parsing module 108.

Figure 2:
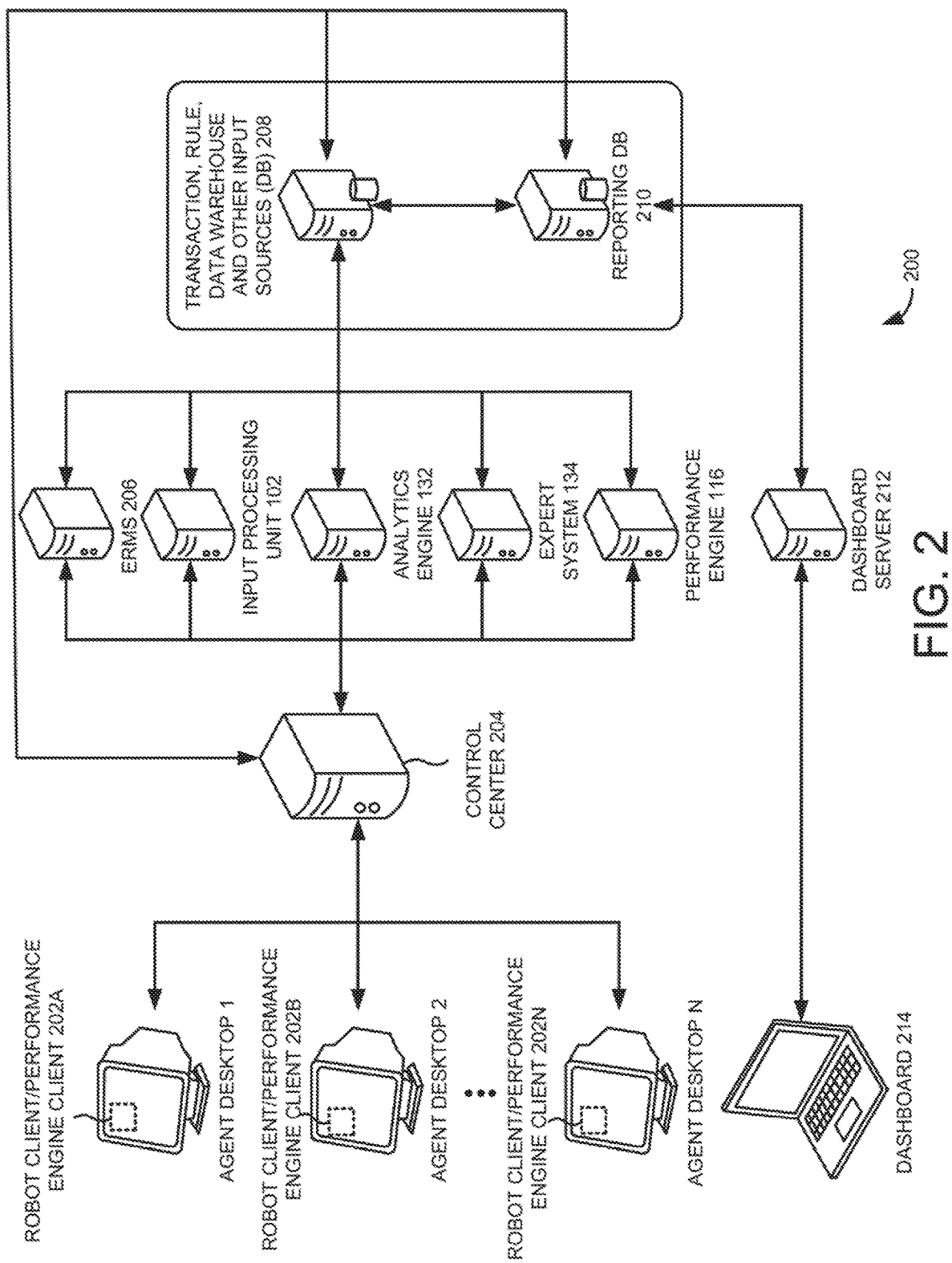
FIG. 2 is another block diagram illustrating an example implementation of the intelligent, interactive, and self-learning RPA system, such as shown in FIG. 1, in an example business process environment.

FIG. 2 is a block diagram 200 illustrating an example implementation of the intelligent, interactive, and self-learning RPA system, such as shown in FIG. 1, in an example business process environment. As shown in FIG. 2, the example implementation includes the input processing unit 102, the performance engine 116, the analytics engine 132, the expert system 134, and an enterprise route management system (ERMS) 206, which are communicatively coupled between a control center 204 and the rules data-base 124 (e.g., transaction, rule, data warehouse and other input sources 208) and a reporting database 210. In one example, transaction, rule, data warehouse and other input sources 208 can include all data necessary for the system 100 except for reporting. For example, transaction, rule, data warehouse and other input sources 208 may include transaction data as in the business process information, the rules identified by the expert system, data warehouse used by the analytics engine 132, and other input sources like employee verification, credits history, builder database (from the loan application example), and the like. Dashboard server 212 provides all administration capabilities like manage, schedule and monitor progress of the robots. The dashboard server 212 also provides historical information of the robots execution and comparison of benchmark information or process performance targets with the actual robot performance. Dashboard 214 may be a browser based graphical user interface (GUI) which is rendered by connecting to the dashboard server 212. The administrator and business users use this GUI to accomplish their tasks. Further as shown in FIG. 2, the control center 204 is coupled to agent desktops 1-N. Furthermore as shown in FIG. 2, robot clients/performance engine clients 202 A-N resides in each of the respective agent desktops 1-N.

During operation, the input processing unit 102 determines an intent from a customer request received in the form of a structured and/or unstructured data. For example, the term intent refers to "determining purpose of customer's request". Further, the input processing unit 102 parses the customer request to extract relevant data based on the determined intent and the received structured and/or unstructured data. In some embodiments, the structured and/or unstructured data is received via voice, fax, workflow management system, web services, email, chat and the like. Further in some embodiments, the intent identifier 106 determines the intent from the customer request received in the form of structured and/or unstructured data. The parsing module 108 then parses to extract the relevant data from the determined intent and the received structured and/or unstructured data. For example, in a housing loan approval business process scenario, a prospective customer may send an email request for a housing loan for an amount X. The customer may provide employment, salary, and other such relevant details via the email request. The customer may also provide the details of the property, such as, address, construction company, cost and so on, in the same email message. In such a scenario, the input processing unit 102 would determine the intent, which is a request for housing loan approval, and extracts the relevant data (e.g., employment, salary, property address, cost and so on) from the email request. Such an email message can include both the structured and unstructured data.

In some embodiments, the format/document converter 103 converts the received voice, email and/or chat to text in a single data format. In these embodiments, the natural language processing (NLP) engine 104 then determines the intent and the relevant data from the converted text. For example, after determining the intent there could be several pieces of data that are relevant to that intent which are either all part of the input (i.e., customer request) or the input has few key pieces of information which could then be used to retrieve rest of the related information from other data sources. The relevant and/or related information may have to be parsed and extracted again from the received structured/unstructured data. The determined intent may be used in deciding the specific robot that may be invoked for performing rest of the business process. The NLP engine 104 may include features like sentence detection, part-of-speech tagging, named entity extraction and the like. These features may assist in identifying named entities like people, location, organization, date, time, monetary value, numbers, percentages and so on.

Figure 3A:
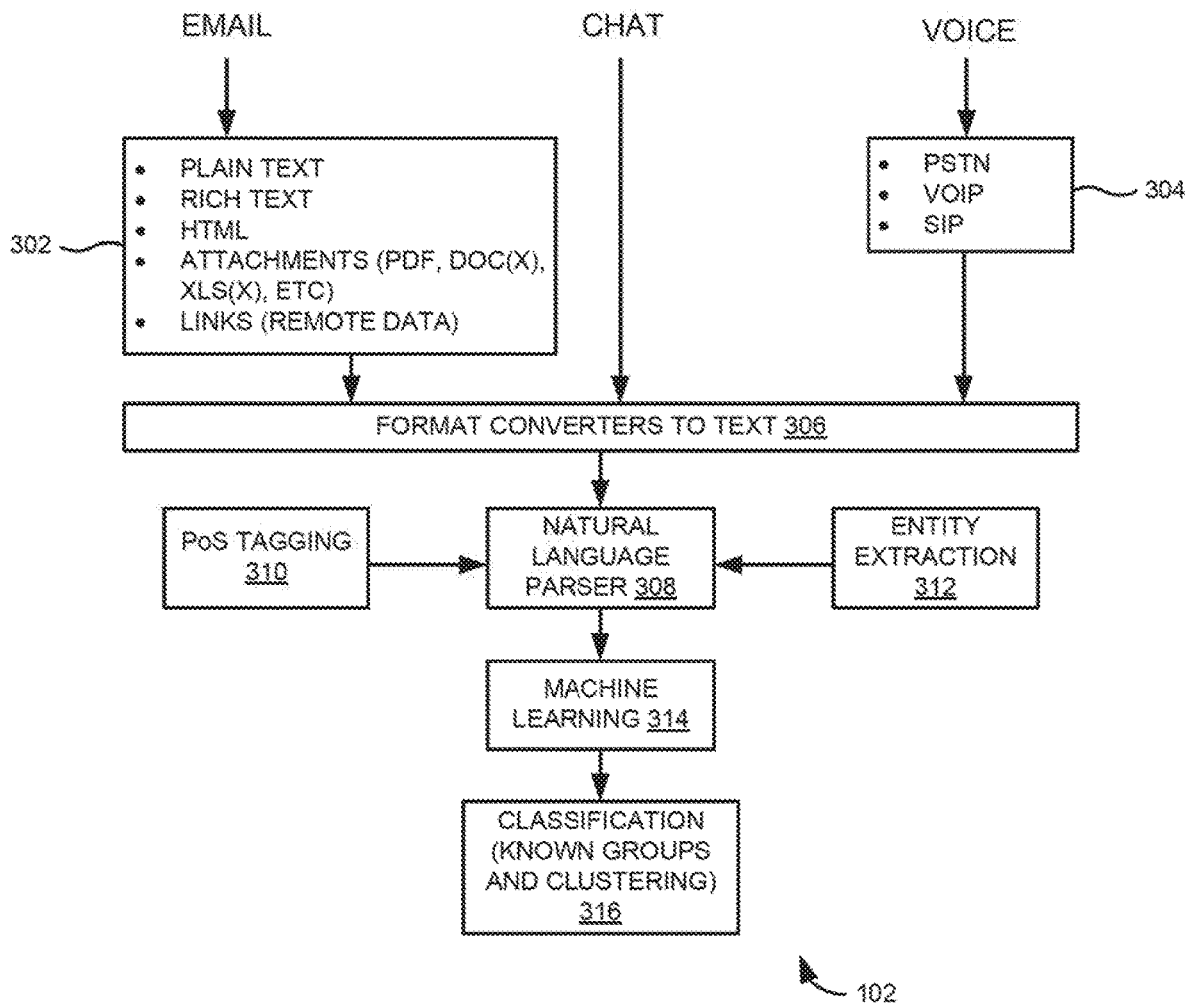
FIG. 3A is an example flow diagram including some functional components showing the operation of an input processing unit, such as those shown in FIGS. 1 and 2.

In the aforementioned home loan example, the determined intent may be, home loan, housing loan, loan for apartment, loan for house and so on. After identifying one of these intents from the received structured/unstructured data, the NLP engine 104 may be used to parse the received structured/unstructured data further to extract the named entities and relevant data, such as requested loan amount, employment, salary, permanent account number (PAN), property address, builder associated with the property, and price. For relevant data like PAN number, which may be a 10 character alpha-numeric text, regular expressions like "[A-Za-z]{5}\d{4}[A-Za-z]{1}" may need to be used. FIG. 3A is a block diagram including functional components 302 to 316, explaining in more detail the operation of the input processing unit 102.

The input processing unit 102 then sends the determined intent and the parsed and extracted relevant data for validation and rectification by the validation and rectification agent 110. One skilled in the art can envision implementing this task automatically by a software robot or by a human based on the process and implementation feasibility.

One or more verification software robots 112 may then verify the extracted relevant data based on the outcome by the validation and rectification agent 110. In the aforementioned home loan example, one or more of the verification software robots 112 may be invoked to verify relevant data, such as, employer information, employee name, salary, credit score associated with the PAN number and the like by connecting to relevant web services.

The analytics engine 132 then extracts applicable rules from the associated knowledge databases 130 based on the determined intent and the relevant data upon successful validation, rectification and verification. In some embodiments, the analytics engine 132 discovers various patterns from the associated knowledge databases 130 using one or more mining modules (e.g., residing in analytics engine 132) based on the determined intent and the relevant data upon successful validation, rectification and verification, and extracts applicable rules from the discovered patterns. In an example embodiment, the analytics engine 132 includes a data warehouse with large volume of data from disparate sources. The analytics engine 132 using different data mining modules may discover various rule patterns. These rule patterns could then directly form applicable rules to be applied by the expert systems 134. In some other embodiments, the rule patterns may be presented to the analytics engine 132, which can then decide on forming relevant rules. The rules database 124 may then be updated accordingly.

In some embodiments, the analytics engine 132 may gather from disparate sources and look for patterns. For example, the credit history can be from different database, the building information can be from a different system, the employer of the loan application can be from a different system and so on. The analytics engine 132 may then find patterns like risk associated with a builder, an employer or a credit history. With such information, the analytics engine 132 may then arrive at rules of whether to approve, not approve, and/or how much to approve. While on the other hand, the expert system 134 may look at a normalized historical database of loan applications with approval status and then arrive at rules. The analytics engine 132 can feed into the expert system 134 to arrive at rules as well.

The expert system 134 then determines rules, associated with the customer request, from the extracted applicable rules, the determined intent and/or the relevant data and sends the determined rules for review by the reviewing agent 126. In some embodiments, the expert system 134 determines rules associated with the customer request by comparing a knowledge based domain information residing in the rules database 124 with the extracted applicable rules. The expert system 134 then sends the determined rules for review by the reviewing agent 126. In some embodiments, the expert system 134 may learn from the determined rules over a predetermined period to improve accuracy of the determination of rules so that the expert system 134 can perform independently without requiring a review by the reviewing agent 126. It can be envisioned that the reviewing agent 126 can be an automated system or a human being based on the needs and requirements of the business process.

Figure 3B:
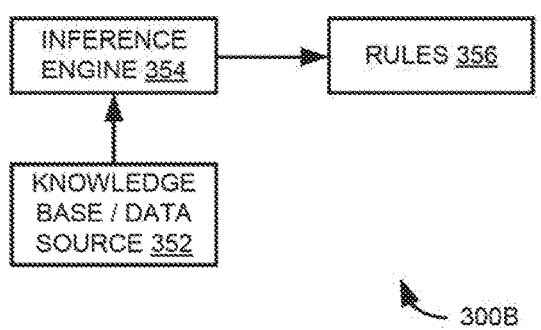
FIG. 3B is an example block diagram showing functional components of an expert system, such as those shown in FIGS. 1 and 2.

In some embodiments, the expert system 134 may look at a large knowledge base 352 (shown in FIG. 3B) of domain information to arrive at the relevant rules. The relevant rules may form the rules database 124. Given the specific facts of a transaction an inference engine 354 (shown in FIG. 3B) may then identify the relevant rules 356. The identified relevant rules 356 can then be passed on to one or more decision making software robots 122 to take necessary action. The same task could as well be performed by a custom program including the coded rules database. However, it can be envisioned that a generic expert system can adapt to different domains if the knowledge base 352 specific to the domain is given. In the aforementioned home loan example, the database of all home loan applications approved/disapproved in the past prior to full automation may form the knowledge base 352. The expert system's inference engine 354 (shown in FIG. 3B) may be configured to go through large database(s) and arrive at various relevant rules 356. Basically, several rules for loan approval and loan disapproval could be identified. Given the score/weightage for various factors like salary, credit score, age, property approval, property cost and the like, the inference engine 354 (shown in FIG. 3B) may decide whether the loan can be approved or not. Additionally, the inference engine 354 may also decide the approved loan amount, tenure and rate of interest based on the scores/weightages.

In some embodiments, the result of the input processing unit 102 and the expert system 134 may be directly fed to software robots for complete automation. However, in some embodiment, an agent intervention may be needed to validate the results before the determined intent and relevant data can be handed over to the associated software robots to perform their assigned tasks. The agent intervention may validate the processed input after format conversion and pass the converted text through the NLP engine 104 to retrieve intent and related data. Similarly, the agent may be presented with a rule that the expert system 134 seems appropriate to be the relevant one along with the rule outcome (approved/not approved in the home loan example). The agent can then either accept or override the rule. Any changes made by the agent may then act as feedback for the expert system 134 and the NLP engine 104.

In some embodiments, when the analytics engine 132 and the expert system 134 detect a rule, the rule may be presented to the reviewing agent 126. The reviewing agent 126 may go through the presented rule and accept the rule without any changes. On the other hand, the reviewing agent 126 may suggest changes to the presented rule, if the presented rule is not relevant, before submitting for further processing in the software application. For example, if the customer is 42 years old, earning about $160K and from a northern region of a country, then the expert system 134 may present the rule as "all customers above age 40 and salary $100K are eligible". The reviewing agent 126 may then change the rule as saying "the customer is from the northern part of the country and hence this rule may not be applicable". Instead, the reviewing agent 126 may choose "all customers who are between the age of 30 to 60 and who live in northern part of the country and earn more than $150K are eligible for the loan".

In some embodiments, based on the actions taken corresponding response may be communicated to the customer. In some embodiment, templates for specific kinds of actions can be prepared and stored in a repository. The appropriate template can then be picked and filled with necessary information based on the action and then communicated to the customer. In these embodiments, an output communication channel may need to be the same as an input communication channel. In such a scenario, email inputs may receive an email response and voice inputs may receive a voice response.

An output module including one or more decision making software robots 122 may then prepare and send the decision to the customer based on the outcome of the reviewed determined rules. In some embodiments, the performance engine 116 may determine a process context and a target application context associated with the received customer request based on observing and storing all interactions taking place in the system. For example, process context may be part of a business process that is currently being performed or to be performed. In our housing loan example, salary verification, credit history retrieval, finding price of the property, builder verification and so on are all part of the process. At any point-in-time, any one of those may have to be performed which may be referred to as the current process context. So, for example, if salary verification has to be done then process context is salary verification. Similarly, the process steps are performed in a target software application like SAP, salesforce and the like. To perform salary verification, one may have to visit 3 to 4 screens in the software application and may further perform 10 to 20 steps to complete the salary verification. Depending on which step needs to be performed next or which step has been currently performed, the software application context may be identified. For example, which screen and GUI element did the agent/robot interact at last and what is the screen/GUI element that the agent/robot may have to interact next to continue performing the process.

Figure 3C:
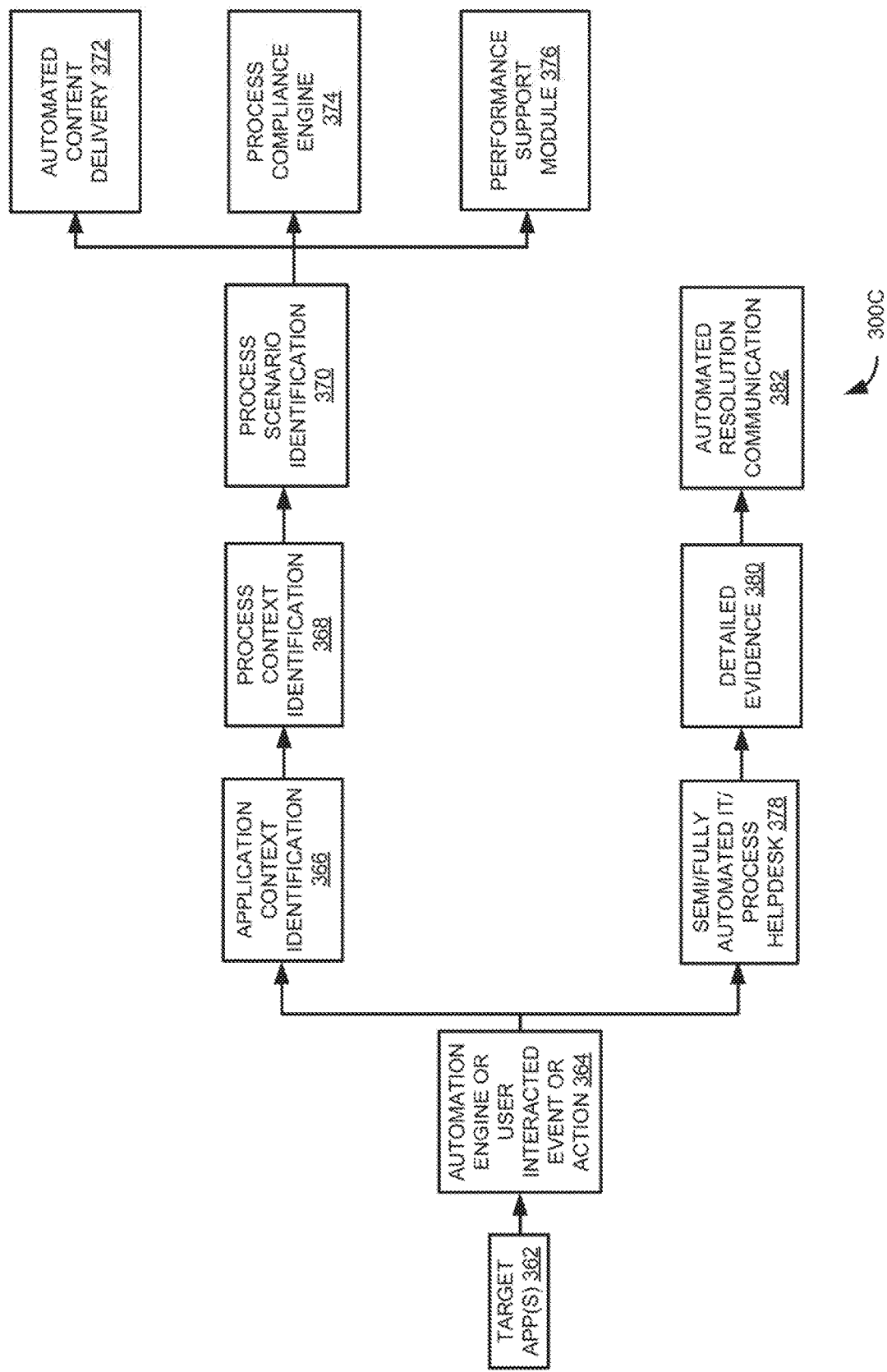
FIG. 3C is another example block diagram showing functional components of a performance engine, such as those shown in FIGS. 1 and 2.

In some embodiments, whenever a human is performing a task where efficiency and accuracy may not be guaranteed, it may be necessary to provide the user with thorough training and several just-in-time on-the-job tools that assist them in being effective. All the tools may be dependent on accurate understanding of the process context and the target application context. In such cases, the performance engine 116 may assist in intelligently identifying the target application context. The performance engine 116 may then observe all interactions with the target application either by the user or by a software robot. The performance engine 116 may maintain a trail of the business process interactions in the form of a script. These trails may be stored in a process repository. The process repository may maintain a list of processes, steps necessary to perform a process, alternate ways of performing a process and the like. Using the process repository and given a particular context, the performance engine 116 may be able to identify the business process and specific variation of the business process that the user may be performing. FIG. 3C is a block diagram 300C, including functional components 362 to 382, explains in more detail the operation of the performance engine 116.

The context is then identified by matching parameters like application name, application version, screen or page name, control name, control type, control identifier, control index, control type index, control region, event/action, control data, state and so on. Several of these matching parameters may be dynamic in nature between instances of a target application. An application context identification engine (e.g., 366 as shown in FIG. 3C) may have in-built configurable rules and intelligence that will adapt itself to unambiguously identify the control. The term "control" here refers to a graphical user interface (GUI) element in the entire document. The context identification engine may comprise an application identifier, a screen identifier and/or a control identifier. The context identifier may be able to provide the absolute context of the application.

Business processes can have many variations and scenarios. It is likely that several parts of how the process is performed would consist of the same set of screens. Only a few steps in the business process could be unique to a variation or scenario. The context identification engine may have the historical stream of performed steps. The context identification engine then uses this stream to identify the unique pattern of steps that are part of a particular variant. However, if the process variants have a lot of common steps in the beginning and if the current context is somewhere in this set of common steps then the context identification engine may match all the variants that the stream of steps are a part of. As the user progresses further with the process and reaches a state that is unique to a particular variant, the context identification engine may immediately filter out the other variants and identify that one particular variant.

Figure 4A:
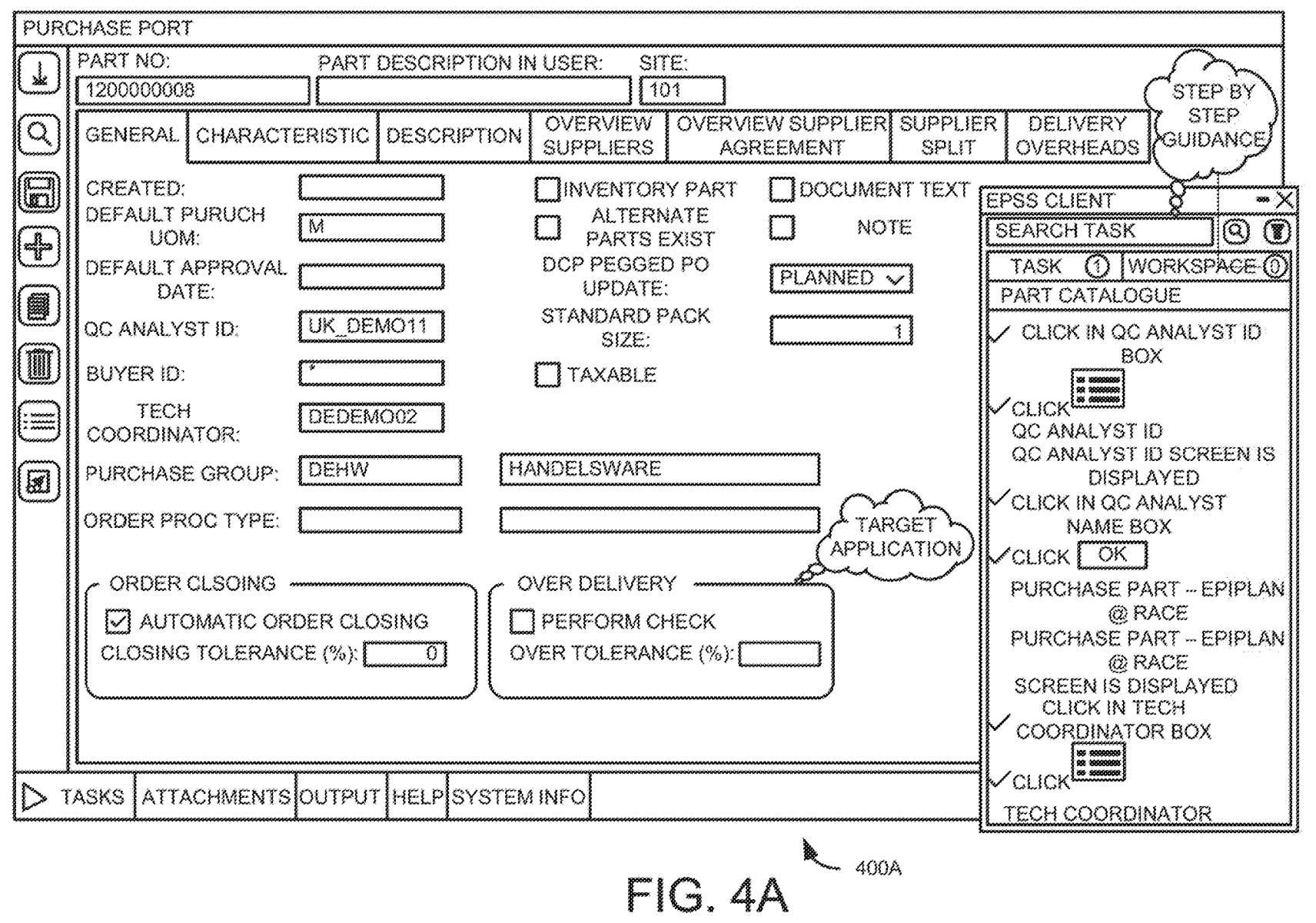
Figure 4B:
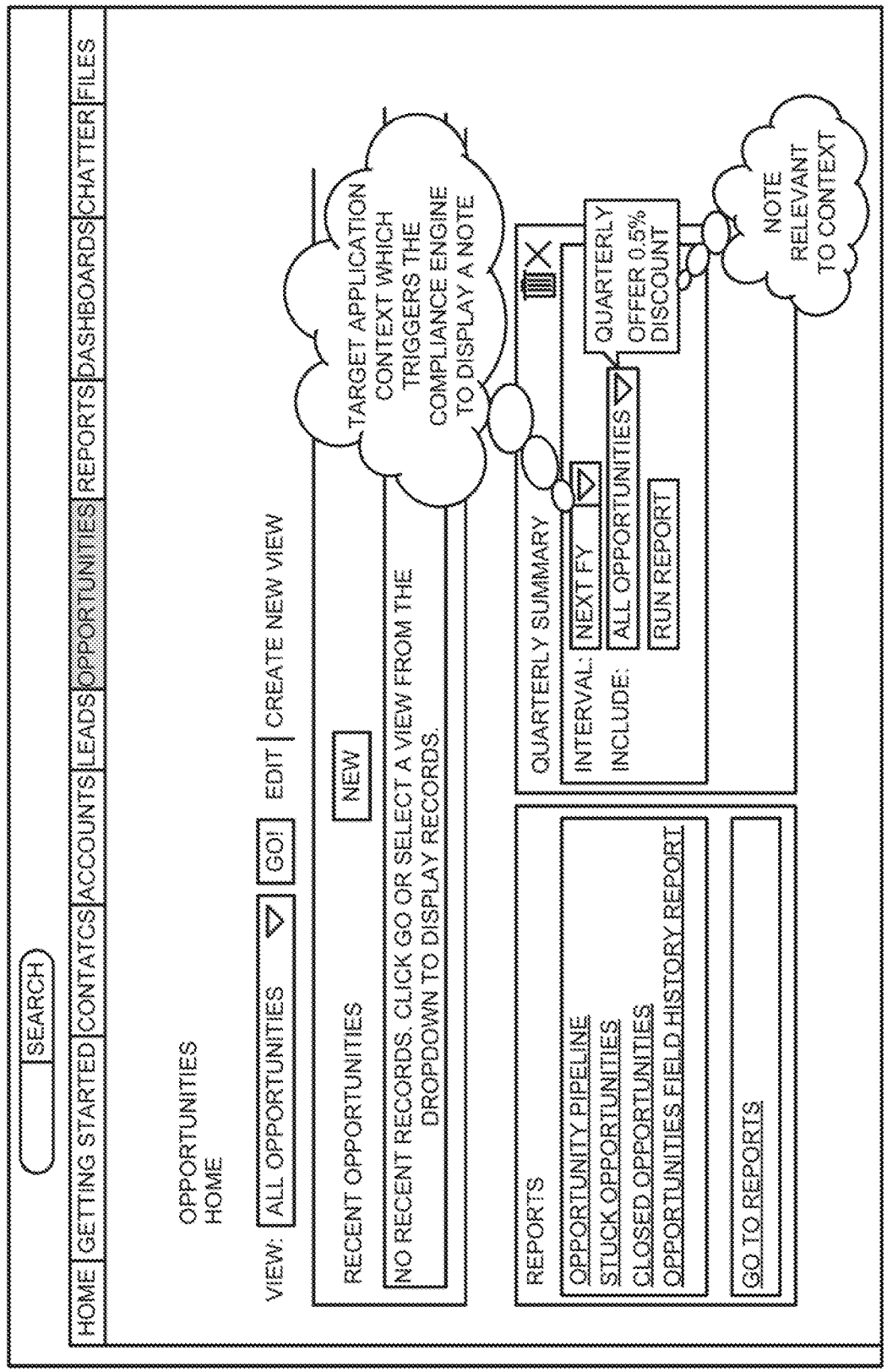
FIG. 4B depicts a screenshot of an example user interface showing a context relevant note provided by a process compliance engine residing in the performance engine.

For example, inexperienced users may require guidance while performing their jobs even though they may have undergone training. Sometimes a significant period of time may be required for users to ramp up to the level of an expert. The performance engine 116 in co-ordination with a context identifier may provide a needed just-in-time step-by-step guidance to the user. Content generated by an automated content generator or 3rd party content can be used for this purpose. As the user follows the provided instructions and performs the process steps, the performance support module shows progress and provides instructions on the next step to be performed as shown in the user interface 400A (FIG. 4A). This kind of support may assist the users to quickly attain the needed expertise with greater confidence to perform the process steps without requiring hand holding from other expert users.

Very often training materials do not provide all possible scenarios or tacit knowledge that is gathered over time by users. Further, business rules can undergo change. Furthermore, the training material may not be up-to-date. Even if the training materials are up-to-date, they may not be easily accessible to users when they need the information. Making the tacit knowledge and the current rules available to all users can help overcome several of the user's performance problems. A process compliance engine (e.g., 374 as shown in FIG. 3C) may have the ability to associate tacit knowledge to a specific application context. The context and the rules can be simple constituting just one control in a particular screen with its state matching a certain criterion. More complex context consisting of a sequence of steps and rules including several control's state matching certain criteria can also be used. This is shown in more detail in the user interface 400B of FIG. 4B.

In our running home loan example, a loan over $10,000 may have a special discount of 0.5% in interest rate, which may be a newly introduced rule, applicable during a holiday season. Using the process compliance engine 374 (as shown in FIG. 3C), a subject matter expert (SME) (or any other user aware of the rule) can associate the context, rule and the content in which they instruct users to offer the discount. Whenever any other user reaches the same context with the rule matching they will be automatically presented with the content instructing them to offer the discount. This can significantly reduce errors, reduce need for seeking expert help and help operations team manage their business without having to involve information technology (IT). An example automatically presented content may be as follows:

Loan Amount>$10,000 and Current Date between (1 Jan. 2016 and 31 Mar. 2016) then discount=0.5%

Loan Amount>$10,000 and Age between (25 and 30) and Loan Tenure<5 years and Current Date between (1 Jan. 2016 and 31 Mar. 2016) then discount=0.75%

Any training material either generated manually or using automated tools can be consumed effectively by users on-the-job through an automated content delivery system. A context identifier associated with the performance engine 116 can assist in matching relevant content given the context in which a user may be currently operating. While class room training may be useful, studies have shown that on-the-job scenario based learning may be more effective and improves knowledge retention in users.

Users on encountering technical issues, may contact helpdesk. In such a scenario, the helpdesk agent may ask the user to describe the actions performed by them before encountering the issue and the error reported by the system. They are likely to ask the user to either send screenshots or through remote screen sharing tools may ask the user to recreate the issue for them to observe and understand the problem before they can provide a solution. This may not always be possible for the user to recreate the issue. The helpdesk agent may not be free when the issue is encountered. All these aspects can hamper the productivity of the user.

The automated helpdesk solution may make use of the performance engine 116. The performance engine 116 observes and stores all the user interactions with a software application. These stored interactions could be automatically converted into a document or video demonstrating the series of steps the user performed before they encountered an error. The actual error encountered could also be part of the document/video. This evidence can be shared with the helpdesk agent as part of a raised ticket. This provides partial benefits.

Furthermore, advanced helpdesk system uses self-learning to keep track of the context in which the error was encountered and a solution was provided by the helpdesk agent. This information may be stored in a process repository. In the future, when a similar error is encountered by other users, the helpdesk engine can automatically detect an available solution for the problem and communicate the solution immediately to the user. This can reduce the workload on the helpdesk agents who generally keep resolving large number of similar issues. The automated helpdesk can also provide a solution to the user instantly and much faster than a human agent can, and thus improving productivity and reducing downtime for the users.

Figure 5:
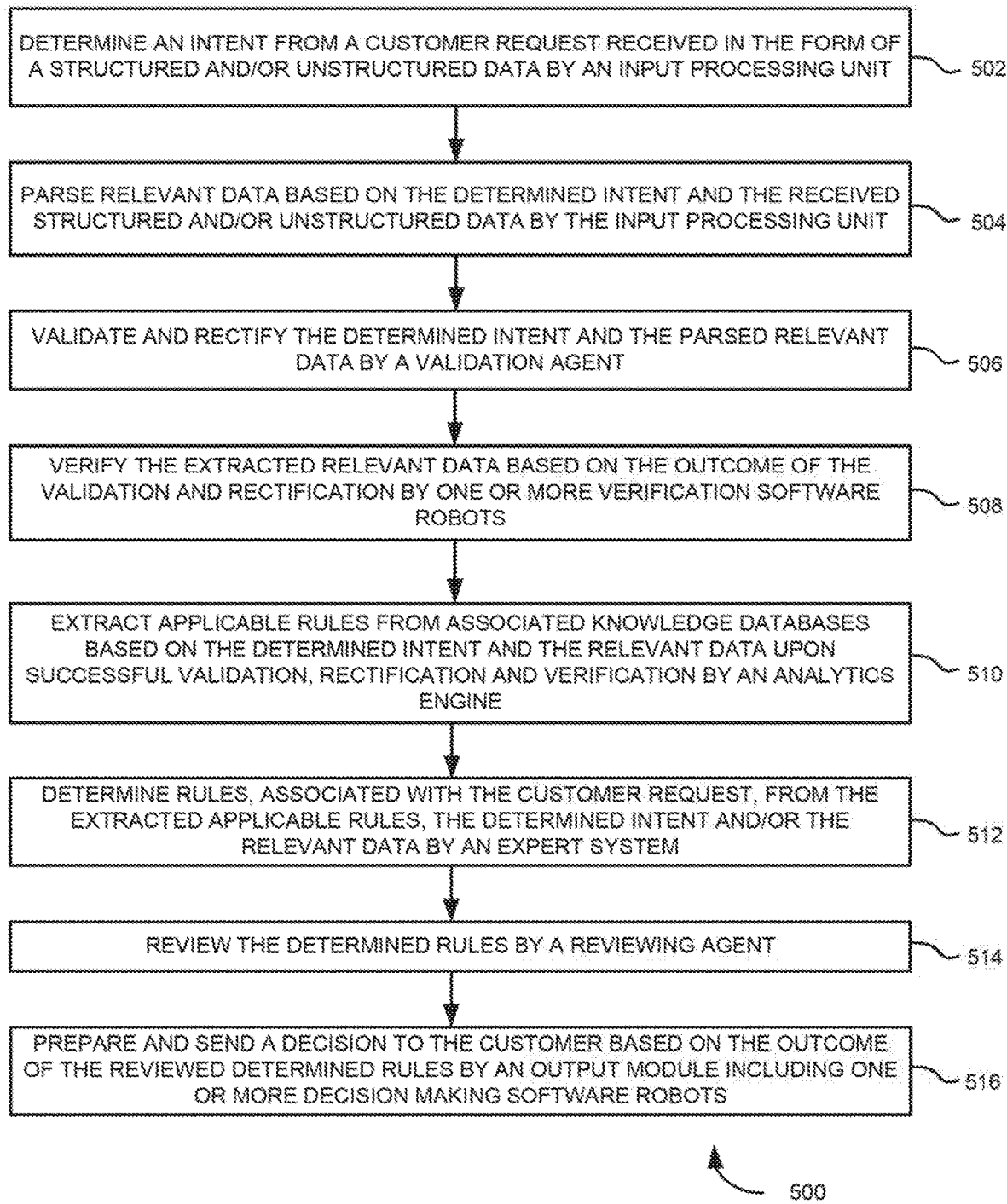
FIG. 5 depicts an example flow diagram of a method for an intelligent, interactive, and self-learning robotic RPA process, such as those shown in FIGS. 1 and 2.

FIG. 5 depicts an example flow chart 500 of a process for the intelligent, interactive, and self-learning RPA system. It should be understood that the process depicted in FIG. 5 represents generalized illustrations, and that other processes may be added or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate programs, or use a combination of hardware and program to perform the illustrated processes.

At 502, an intent is determined from a customer request received in the form of a structured and/or unstructured data by an input processing unit. At 504, relevant data is parsed based on the determined intent and the received structured and/or unstructured data by the input processing unit. At 506, the determined intent and the parsed relevant data may then be sent for validation and rectification by a validation and rectification agent.

At 508, the extracted relevant data may be verified based on the outcome of the validation and rectification by one or more verification software robots. At 510, applicable rules are extracted from associated knowledge databases based on the determined intent and the relevant data upon successful validation, rectification and verification by an analytics engine. At 512, rules, associated with the customer request, are determined from the extracted applicable rules, the determined intent and/or the relevant data by an expert system. At 514, the determined rules are sent for review by a reviewing agent.

At 516, a decision is then prepared and sent to the customer based on the outcome of the reviewed determined rules by an output module including one or more decision making software robots. The process 500 is explained in more detail with respect to FIGS. 1 and 2 and the steps 602-620 shown in an example flow diagram 600 of FIG. 6.

Figure 7:
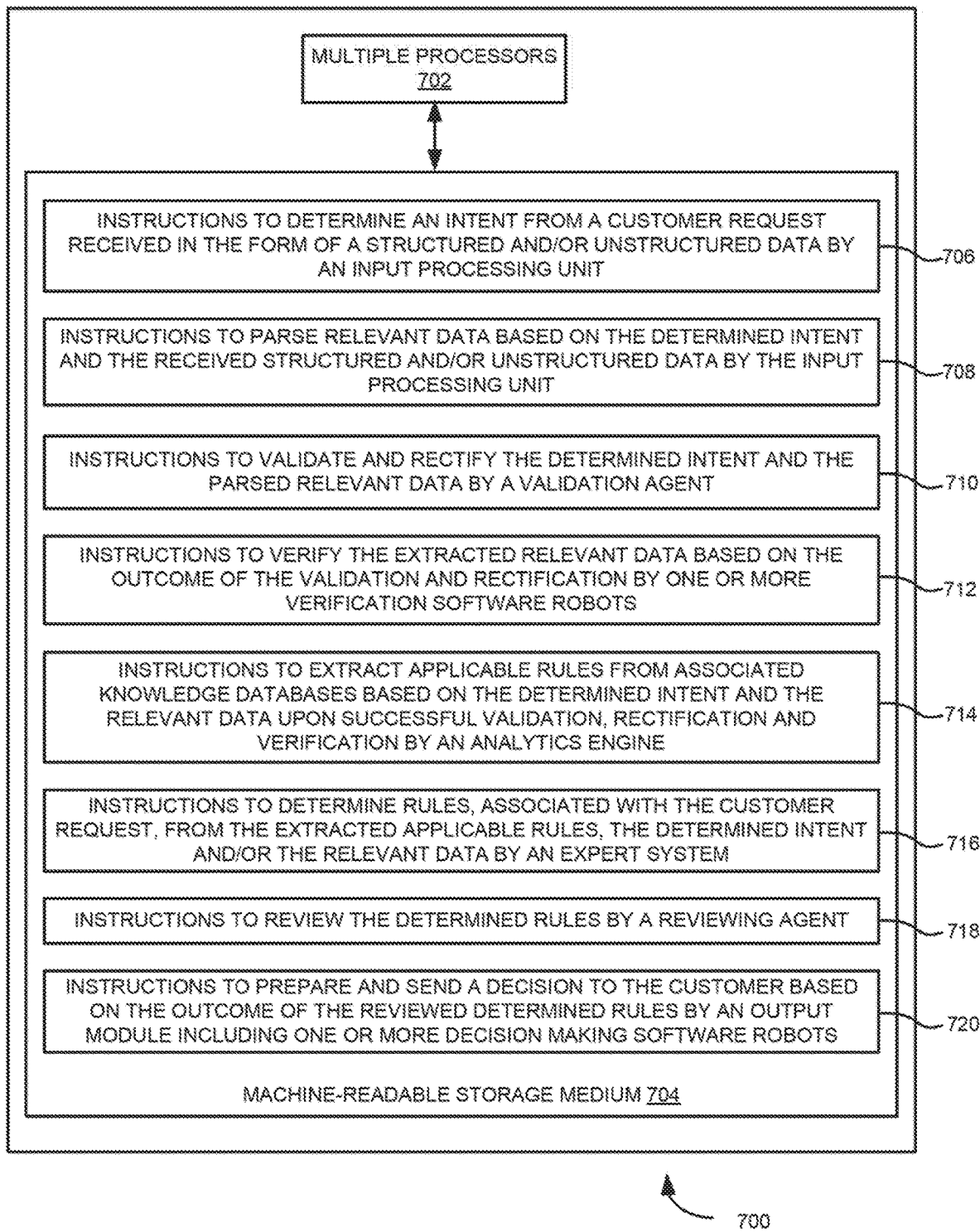
FIG. 7 is a block diagram block diagram of an example computing device including non-transitory machine-readable medium storing instructions for the intelligent, interactive, and self-learning RPA.

FIG. 7 is a block diagram of an example computing system 700 including instructions in a machine-readable storage medium for intelligent, interactive, and self-learning RPA system. System 700 includes a processor(s) 702 and a machine-readable storage medium 704 communicatively coupled through a system bus. In an example, system 700 may be analogous to a plurality of agent desktops 1-N and the control center 204, the input processing unit 102, the analytics engine 132, the expert system 134 and the performance engine 116 of FIGS. 1-2. Processor 702 may be any type of Central Processing Unit (CPU), microprocessor, or processing logic that interprets and executes machine-readable instructions stored in machine-readable storage medium 704. Machine-readable storage medium 704 may be a random-access memory (RAM) or another type of dynamic storage device that may store information and machine-readable instructions that may be executed by processor 702. For example, machine-readable storage medium 704 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium may be a non-transitory machine-readable medium.

Machine-readable storage medium 704 may store instructions 706, 708, 710, 712, 714, 716, 718 and 720. In an example, instructions 706 may be executed by processor 702 to determine an intent from a customer request received in the form of a structured and/or unstructured data by an input processing unit. Instructions 708 may be executed by processor 702 to parse relevant data based on the determined intent and the received structured and/or unstructured data by the input processing unit. Instructions 710 may be executed by processor 702 to validate and rectify the determined intent and the parsed relevant data by a validation and rectification agent. Instructions 712 may be executed by processor 702 to verify the extracted relevant data based on the outcome of the validation and rectification by one or more verification software robots. Instructions 714 may be executed by processor 702 to extract applicable rules from associated knowledge databases based on the determined intent and the relevant data upon successful validation, rectification and verification by an analytics engine. Instructions 716 may be executed by processor 702 to determine rules, associated with the customer request, from the extracted applicable rules, the determined intent and/or the relevant data by an expert system. Instructions 718 may be executed by processor 702 to review the determined rules by a reviewing agent. Finally, instructions 720 may be executed by processor 702 to prepare and send a decision to the customer based on the outcome of the reviewed determined rules by an output module including one or more decision making software robots.

Figure 6:
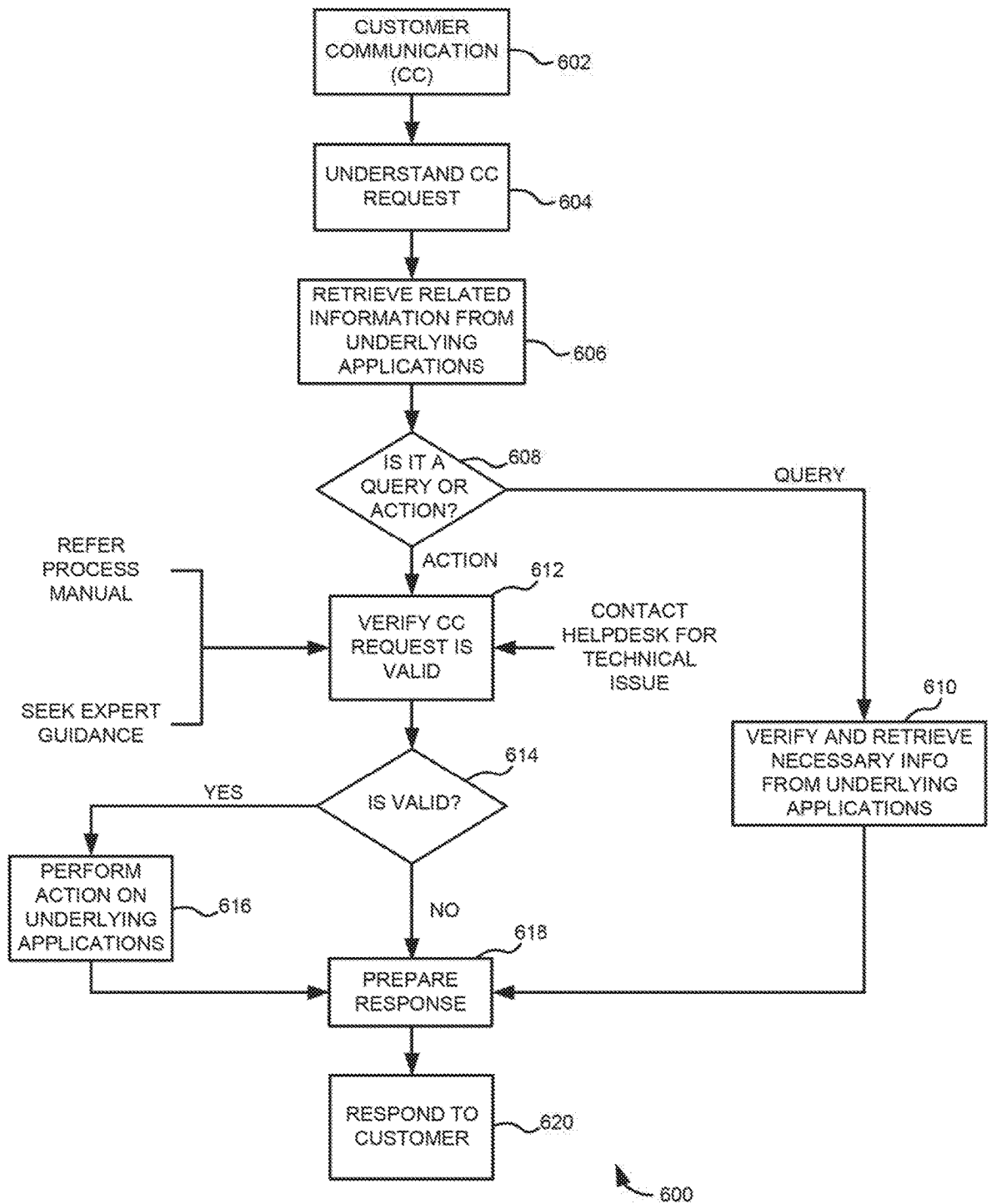
FIG. 6 depicts another example flow diagram of a method for the intelligent, interactive, and self-learning RPA, such as those shown in FIGS. 1 and 2.

For the purpose of simplicity of explanation, the example methods of FIGS. 5, 6 and 7 are shown as executing serially, however it is to be understood and appreciated that the present and other examples are not limited by the illustrated order. The example systems of FIGS. 1 and 2, and method of FIGS. 5, 6 and 7 may be implemented in the form of a computer program product including computer-executable instructions, such as program code, which may be run on any suitable computing device in conjunction with a suitable operating system (for example, Microsoft Windows, Linux, UNIX, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

Although specific embodiments have been described above, these embodiments are not intended to limit the scope of the present disclosure, even where only a single embodiment is described with respect to a feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing detailed description, some features are grouped together in a single embodiment for streamlining the disclosure. This method of disclosure is not to be interpreted as reflecting an intention that the disclosed embodiments of the present disclosure must use more features than are expressly recited in each claim. Rather, as the following claims reflect, inventive subject matter lies in less than all features of a single disclosed embodiment. Thus, the following claims are hereby incorporated into the detailed description, with each claim standing on its own as a separate embodiment.

What is claimed is:

1. An intelligent, interactive, and self-learning robotic process automation system, comprising:
   a processor;
   memory coupled to the processor, wherein the memory comprises:
      an input processing unit comprising an intent identifier to determine an intent from a customer request received in a form of a structured and/or unstructured data, and a parsing module to parse relevant data based on the determined intent and the received structured and/or unstructured data, wherein the input processing unit sends the determined intent and the parsed relevant data for manual validation and rectification;
      one or more verification software robots to verify the parsed relevant data by connecting to a web service upon the manual validation and rectification, wherein the one or more verification software robots are selected based on the determined intent and invoked;
      an analytics engine to retrieve applicable rules from associated knowledge databases by discovering various patterns from the associated knowledge databases based on the determined intent and the parsed relevant data upon successful verification by the one or more verification software robots, wherein the discovered patterns include a risk factor associated with the parsed relevant data;
      an expert system to:
         compare knowledge-based domain information residing in a rules database with the retrieved applicable rules, wherein the knowledge-based domain information includes historical data associated with customer requests that were approved/disapproved; and
         determine rules, from the retrieved applicable rules, that match with the knowledge-based domain information, wherein the expert system sends the determined rules for review by a reviewing agent; and
      an output module including one or more decision making software robots to prepare and send a decision to a customer based on an outcome of the reviewed determined rules, wherein the decision is sent in the received form of the structured and/or unstructured data by automatically filling out an associated pre-configured template for a specific kind of action.

2. The system of claim 1, wherein the customer request, including the structured and/or unstructured data, is received via voice, fax, workflow management system, web services, email or chat.

3. The system of claim 2, wherein the decision to the customer is sent by automatically filling out the associated pre-configured template for the specific kind of action via the email, fax, voice, workflow management system, web services or chat.

4. The system of claim 1, wherein the input processing unit comprises:
   the intent identifier to determine the intent from the customer request received in the form of structured and/or unstructured data; and
   the parsing module to parse the relevant data based on the determined intent and the received structured and/or unstructured data.

5. The system of claim 4, wherein the input processing unit further comprises:
   a format and/or document converter to receive the customer request via the voice, email or chat to text; and
   a natural language processing (NLP) engine to determine the intent and the parsed relevant data from the converted text.

6. The system of claim 4, wherein the analytics engine discovers the various patterns from the associated knowledge databases using one or more mining modules based on the determined intent and the parsed relevant data upon successful verification by the one or more verification software robots, and wherein the analytics engine further retrieves the applicable rules from the discovered patterns.

7. The system of claim 1, wherein the expert system to learn from the determined rules over a predetermined period to improve accuracy of the determination of the rules and to perform independently without requiring the review by the reviewing agent.

8. A method comprising:
   determining an intent from a customer request received in a form of a structured and/or unstructured data by an intent identifier of an input processing unit;
   parsing relevant data based on the determined intent and the received structured and/or unstructured data by a parsing module of the input processing unit;
   manually validating and rectifying the determined intent and the parsed relevant data;
   verifying the parsed relevant data by connecting to a web service upon the manual validation and rectification by one or more verification software robots, wherein the one or more verification software robots are selected based on the determined intent and invoked;
   retrieving applicable rules from associated knowledge databases, by an analytics engine, via discovering various patterns from the associated knowledge databases based on the determined intent and the parsed relevant data upon successful verification by the one or more verification software robots, wherein the discovered patterns include a risk factor associated with the parsed relevant data;
   comparing knowledge-based domain information residing in a rules database with the retrieved applicable rules, by an expert system, wherein the knowledge-based domain information includes historical data associated with customer requests that were approved/disapproved;
   determining rules, from the retrieved applicable rules, that match with the knowledge-based domain information by the expert system;
   reviewing the determined rules by a reviewing agent; and
   preparing and sending a decision to a customer based on an outcome of the reviewed determined rules by an output module including one or more decision making software robots, wherein the decision is sent in the received form of the structured and/or unstructured data by automatically filling out an associated pre-configured template for a specific kind of action.

9. The method of claim 8, wherein the customer request, including the structured and/or unstructured data, is received via voice, fax, workflow management system, web services, email or chat.

10. The method of claim 9, wherein the decision to the customer may be sent by automatically filling out the associated pre-configured template for the specific kind of action via the email, fax, voice, workflow management system, web services or chat.

11. The method of claim 8, wherein determining the intent from the customer request received in the form of the structured and/or unstructured data by the input processing unit comprises:
  converting the customer request received via the voice, email or chat to text by a format and/or document convertor; and
  determining the intent and the parsed relevant data from the converted text by a natural language processing (NLP) engine.

12. The method of claim 8, wherein retrieving the applicable rules from the associated knowledge databases based on the determined intent and the parsed relevant data by the analytics engine, comprises:
  discovering the various patterns from the associated knowledge databases using one or more mining modules based on the determined intent and the parsed relevant data upon successful verification by the one or more verification software robots; and
  retrieving the applicable rules from the discovered patterns.

13. The method of claim 8, further comprising:
  learning the determined rules over a predetermined period to improve accuracy of the determination of rules; and
  performing independently without requiring the review by the reviewing agent upon learning the determined rules.

14. A non-transitory machine-readable medium storing instructions executable by a processing resource to cause the processing resource to:
  determine an intent from a customer request received in the form of a structured and/or unstructured data by an intent identifier of an input processing unit;
  parse relevant data based on the determined intent and the received structured and/or unstructured data by a parsing module of the input processing unit;
  manually validate and rectify the determined intent and the parsed relevant data;
  verify the parsed relevant data by connecting to a web service upon the manual validation and rectification by one or more verification software robots, wherein the one or more verification software robots are selected based on the determined intent and invoked;
  retrieve applicable rules from associated knowledge databases, by an analytics engine, via discovering various patterns based on the determined intent and the parsed relevant data upon successful verification by the one or more verification software robots, wherein the discovered patterns include a risk factor associated with the parsed relevant data;
  compare knowledge-based domain information residing in a rules database with the retrieved applicable rules, by an expert system, wherein the knowledge-based domain information includes historical data associated with customer requests that were approved/disapproved;
  determine rules, from the retrieved applicable rules, that match with knowledge-based domain information by the expert system;
  review the determined rules by a reviewing agent; and
  prepare and send a decision to a customer based on an outcome of the reviewed determined rules by an output module including one or more decision making software robots, wherein the decision is sent in the received form of the structured and/or unstructured data by automatically filling out an associated pre-configured template for a specific kind of action.

15. The non-transitory machine-readable medium of claim 14, wherein the customer request, including the structured and/or unstructured data, is received via voice, fax, workflow management system, web services, email or chat.

16. The non-transitory machine-readable medium of claim 15, wherein the decision to the customer may be sent by automatically filling out the associated pre-configured template for the specific kind of action via the email, fax, voice, workflow management system, web services or chat.

17. The non-transitory machine-readable medium of claim 14, wherein determining the intent from the customer request received in the form of the structured and/or unstructured data by the input processing unit comprises:
  converting the customer request received via the voice, email or chat to text by a format and/or document convertor; and
  determining the intent and the parsed relevant data from the converted text by a natural language processing (NLP) engine.

18. The non-transitory machine-readable medium of claim 14, wherein retrieving the applicable rules from the associated knowledge databases based on the determined intent and the parsed relevant data by the analytics engine, comprises:
  discovering the various patterns from the associated knowledge databases using one or more mining modules based on the determined intent and the parsed relevant data upon successful verification by the one or more verification software robots; and
  retrieving the applicable rules from the discovered patterns.

19. The non-transitory machine-readable medium of claim 14, further comprising:
  learning the determined rules over a predetermined period to improve accuracy of the determination of rules; and
  performing independently without requiring the review by the reviewing agent upon learning the determined rules.

* * * * *